Aug. 3, 1965  R. G. BRIGHT  3,197,821
SEALING STRIPS, BEADINGS OR MOULDINGS
Filed Feb. 1, 1962  2 Sheets-Sheet 1
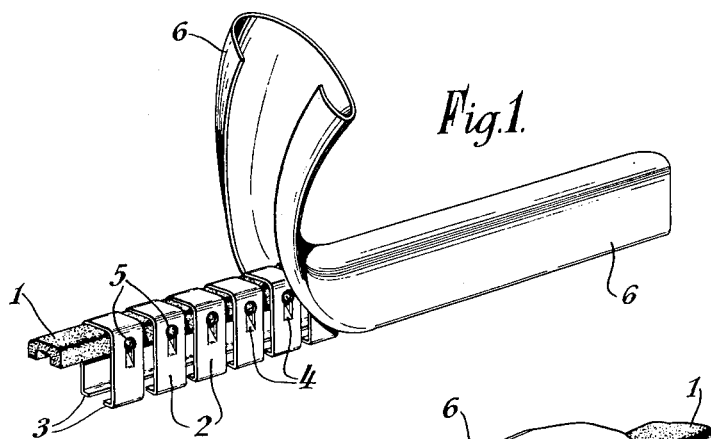
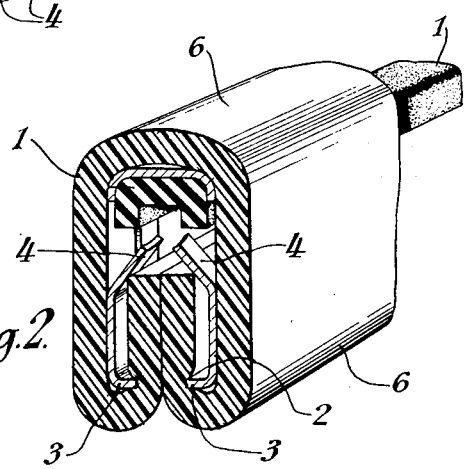
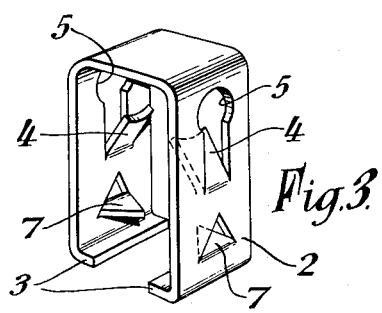
ROBERT GRANVILLE BRIGHT
INVENTOR
BY DEAN FAIRBANKS HIRSCH
ATTORNEYS Aug. 3, 1965    R. G. BRIGHT    3,197,821
SEALING STRIPS, BEADINGS OR MOULDINGS
Filed Feb. 1, 1962    2 Sheets-Sheet 2
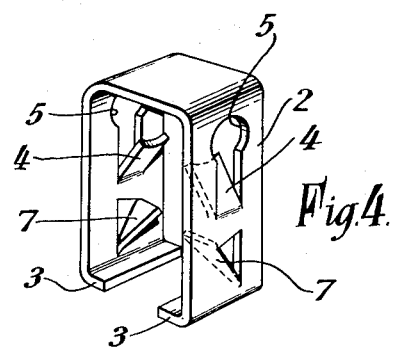
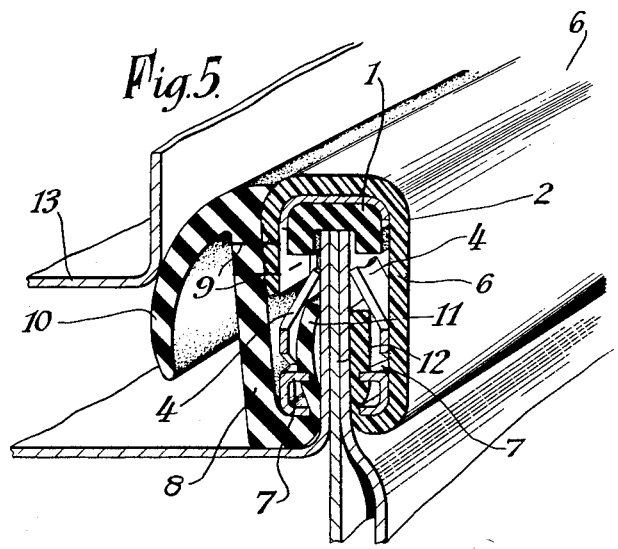
ROBERT GRANVILLE BRIGHT
INVENTOR
BY
DEAN, FAIRBANKS HIRSCH
ATTORNEYS

United States Patent Office 3,197,821
Patented Aug. 3, 1965

3,197,821
SEALING STRIPS, BEADINGS OR MOULDINGS
Robert G. Bright, Leamington Spa, England, assignor to Bright Manufacturing Company Limited, Coventry, England
Filed Feb. 1, 1962, Ser. No. 170,468
Claims priority, application Great Britain, Oct. 13, 1961, 36,833/61
5 Claims. (Cl. 20—69)

This invention relates to sealing strips, beadings or mouldings for use on motor vehicles, such components being used either as draught or weather excluders or as ornamental or finishing trimming strips, the invention being concerned with the particular type of sealing strip, beading or moulding which includes a series of spring clips or tags of substantially inverted U shape which straddle a supporting flange and either frictionally engage the flange or alternatively make interlocking engagement with the flange or parts associated therewith.

Such sealing strips, beadings or mouldings are usually mounted on flanges surrounding the door openings of motor vehicles or around motor vehicle luggage compartments and when used as draught or weather excluders are sandwiched between the door or lid and the supporting flange on which the sealing strip is mounted, or otherwise engaged by the door or lid to produce the desired sealing effect.

The chief object of the invention is to evolve a sealing strip, beading or moulding hereinafter generally referred to as a strip, which can be easily and cheaply manufactured and which can be bent very easily around curves of small radius, the strip being capable of universal bending movement.

A strip in accordance with the present invention includes essentially a longitudinally flexible spine carrying a plurality of spaced substantially inverted U shaped clips or tags adapted to straddle and make direct or indirect frictional or interlocking engagement with a supporting flange or parts associated therewith, and a covering material enclosing the clips or tags and their associated spine.

When used as a sealing strip, the strip will also be provided with an effective portion of suitable cross-sectional shape which is intended to be sandwiched between the door and the supporting flange. The effective portion may form a part of the covering or may be separately constructed.

The spine may lie externally of the clips or tags but is preferably internally arranged so that the limbs of the clips depend downwardly from the spine.

All the clips or tags may be effective from the point of view of their attachment to the flange but alternatively only a portion of the total number of clips may be effective in a securing sense, the remaining clips serving merely to fill the gaps between the effective clips and provide adequate support for the covering material.

It is preferred to construct the spine from rubber or other suitable inherently flexible material, the spine being conveniently in the form of an inverted channel.

Referring to the accompanying drawings:

FIGURE 1 is a perspective view of a trimming strip in accordance with the invention, the covering material being rolled back to disclose the clips;

FIGURE 2 is a cross-section drawn to an enlarged scale;

FIGURE 3 is a perspective view of one of the clips;

FIGURE 4 is a similar view of an alternative clip; and

FIGURE 5 is a cross-sectional view of a draught excluder or sealing strip in accordance with the invention in position upon a supporting flange.

Referring in the first case to FIGURES 1 and 2, the trimming strip includes an inherently flexible spine 1 which may be composed of rubber, plastic or other comparatively flexible material, the spine being of inverted channel shape in cross-section. The spine is shaped at its upper edge to fit closely into a series of metal clips 2 which are suitably spaced apart, the clips being of substantially inverted U shape in cross-section, the limbs of the clips being inwardly turned at their lower ends as at 3.

The limbs of each clip are formed with inwardly pressed tangs 4 which serve the dual purpose of holding the clips in position on the spine and frictionally engaging the opposite faces of the flange on which the strip is mounted.

The tangs 4 are preferably formed by stamping or pressing circular holes 5 in each clip blank and then pressing the tangs out of the blank, this construction ensuring that the extremities of the tangs will be evenly formed to provide spaced sharp points which will be sufficiently cleanly cut to bite into the surfaces of the supporting flange.

The spine and clips are enclosed in a flexible ornamental covering 6 which may be composed of woven fabric, plastic or other suitable material, the longitudinal edges of the covering being turned inwardly and upwardly around the edges 3 of the clips and being sandwiched between these edges and the surface of the flange, on which the strip is to be mounted.

The clips are constructed from steel, aluminum or other suitable material and if desired only selected clips of a series may be used to hold the strip in position, the remaining clips being dummy clips and merely serving to carry the covering material, in which case the dummy clips may conveniently be constructed from a less expensive material.

In the construction shown in FIGURES 1 and 2 the covering material is maintained in position due to it being sandwiched between the edge 3 and the flange but as shown in FIGURES 3 and 4 the clips may be provided with additional tangs 7 which perforate the covering material and, if required, actually engage the flange.

Two alternative forms of tangs 7 are shown in FIGURES 3 and 4.

In FIGURE 5 a rubber or plastic sealing section 8 is stitched or otherwise secured at 9 to the covering material 6, the sealing section including a leaf type effective portion 10 and an upwardly directed edge 11 which enters the clips and is secured by the tangs 7. The opposite edge of the covering material is perforated by the remaining tangs 7. The strip is shown in position on a flange 12, the effective portion 10 being engaged by a door or other hinged member 13.

The covering material shown in FIGURES 1, 2 and 5 may have a plastic foam or other lining and may, if desired, take the form of a moulding or extrusion.

The tangs 4 by virtue of their upwardly and inwardly inclined formation enable the strip to be easily pressed into position on the supporting flange but effectively resist removal.

In the construction shown, the spine lies internally of the clips but alternatively, it may be externally positioned, in which case the clips may be formed with additional tangs which engage the externally positioned spine.

Due to the longitudinal flexibility of the spine and the fact that it will easily twist throughout its length and the spaced relationship of the clips, the finally produced strip can be bent around curves of very small radius, can be bent universally, and furthermore the strip can be positioned on the flange accurately and then progressively pressed into a position in which the tangs grip the flange and prevent the strip's removal.

I claim:
1. A sealing strip, beading or moulding comprising in combination: a longitudinally flexible spine, a plurality of separate spaced U-shaped clips straddling the spine and spaced along the length thereof, each of said clips having legs extending beyond the spine, a tang extending inwardly from each of said legs between the ends thereof and positioned beneath the spine to retain the latter in position and a covering material enclosing the clips and their associated spine and extending longitudinally of the latter.

2. A sealing strip, beading or moulding as claimed in claim 1, wherein the clips are formed with additional inwardly pressed tangs adjacent the free end of the legs thereof which perforate the covering and hold the latter in position on the clips, the longitudinal edges of the covering being turned upwardly into the interior of the clips.

3. A sealing strip, beading or moulding as claimed in claim 1 wherein the spine is of inverted channel shape in cross-section.

4. A sealing strip, as claimed in claim 1 including an effective sealing portion secured to the covering and adapted to make sealing engagement with a door or other closure member.

5. A sealing strip as claimed in claim 4 for mounting on a supporting flange of a door or other closure member, wherein the sealing portion includes a marginal edge turned upwardly into the interior of the clips and sandwiched between the clips and supporting flange when the sealing strip is in position thereon.

References Cited by the Examiner

UNITED STATES PATENTS

| 2,746,103 | 5/56 | Bright | 20—69 |
| 2,794,757 | 6/57 | Bright | 20—69 |
| 2,954,310 | 9/60 | Truesdell et al. | 20—69 X |

FOREIGN PATENTS

| 649,137 | 1/51 | Great Britain. |
| 673,328 | 6/52 | Great Britain. |
| 714,554 | 9/54 | Great Britain. |
| 741,073 | 11/55 | Great Britain. |
| 753,238 | 7/56 | Great Britain. |
| 851,521 | 10/60 | Great Britain. |

HARRISON R. MOSELEY, *Primary Examiner.*

JEROME SCHNALL, *Examiner.*